(12) United States Patent
Bartz et al.

(10) Patent No.: US 6,790,537 B1
(45) Date of Patent: Sep. 14, 2004

(54) COMPOSITE ELEMENTS CONTAINING POLYISOCYANATE-POLYADDITION PRODUCTS

(75) Inventors: Thomas Bartz, Olching (DE); Georg Knoblauch, Munich (DE); Heike Wild, Olching (DE); Heinz Forster, Wolfratshausen (DE); Jürgen Mertes, Altrip (DE); Hans-Juergen Reese, Olching (DE); Mathäus Rank, Olching (DE); Karl-Werner Hohl, Mammendorf (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/937,788

(22) PCT Filed: Mar. 17, 2000

(86) PCT No.: PCT/EP00/02379

§ 371 (c)(1),
(2), (4) Date: Sep. 28, 2001

(87) PCT Pub. No.: WO00/59718

PCT Pub. Date: Oct. 12, 2000

(30) Foreign Application Priority Data

Mar. 30, 1999 (DE) .......................................... 199 14 420

(51) Int. Cl.⁷ ............................................. B32B 15/08
(52) U.S. Cl. ................. 428/625; 428/425.8; 428/319.1; 427/142
(58) Field of Search .............................. 428/625, 425.8, 428/319.1, 160, 215; 427/142

(56) References Cited

U.S. PATENT DOCUMENTS

| | | |
|---|---|---|
| 3,993,608 A * | 11/1976 | Wells ...................... 428/313.9 |
| 4,304,080 A | 12/1981 | Freeman |
| 4,313,996 A | 2/1982 | Newman et al. |
| RE31,213 E | 4/1983 | Brachman |
| 4,673,102 A | 6/1987 | Bullock, Jr. |
| 4,678,707 A | 7/1987 | Shinozaki et al. |
| 4,680,227 A | 7/1987 | Aoyagi et al. |
| 4,681,816 A | 7/1987 | Hashimoto et al. |
| 4,709,781 A | 12/1987 | Scherzer |
| 4,739,722 A | 4/1988 | Rogstad |
| 4,756,943 A | 7/1988 | Koletzko |
| 4,758,299 A | 7/1988 | Burke |
| 4,850,297 A | 7/1989 | Rogstad |
| 4,883,717 A | 11/1989 | Kitamura et al. |
| 4,937,125 A | 6/1990 | Sanmartin et al. |
| 4,940,360 A | 7/1990 | Weholt |
| 4,942,080 A | 7/1990 | Hevel et al. |
| 4,978,582 A | 12/1990 | Stamm et al. |
| 4,992,323 A | 2/1991 | Vogelesang et al. |
| 5,007,225 A | 4/1991 | Teasdale |
| 5,030,488 A | 7/1991 | Sobolev |
| 5,093,204 A | 3/1992 | Watanabe et al. |
| 5,106,668 A | 4/1992 | Turner et al. |
| 5,116,688 A | 5/1992 | Minamida et al. |
| 5,143,790 A | 9/1992 | Sattinger |
| 5,184,439 A | 2/1993 | Ward |
| 5,198,975 A | 3/1993 | Baker et al. |
| 5,218,919 A | 6/1993 | Krulikowski, III et al. |
| 5,353,502 A | 10/1994 | Hattori et al. |
| 5,359,953 A | 11/1994 | Skaarup et al. |
| 5,391,686 A | 2/1995 | Jadhav et al. |
| 5,398,630 A | 3/1995 | Skaarup et al. |
| 5,424,113 A | 6/1995 | Ray et al. |
| 5,437,903 A | 8/1995 | Christensen |
| 5,477,797 A | 12/1995 | Stuart |
| 5,478,654 A | 12/1995 | Hargis et al. |
| 5,542,365 A | 8/1996 | Jurisch et al. |
| 5,647,933 A | 7/1997 | Christensen |
| 5,649,430 A | 7/1997 | Ward, III |
| 5,688,835 A | 11/1997 | Scherbel et al. |
| 5,741,571 A | 4/1998 | Bowerman et al. |
| 5,773,783 A | 6/1998 | Bowerman et al. |
| 5,794,402 A | 8/1998 | Dumlao et al. |
| 5,797,235 A | 8/1998 | Bowerman et al. |
| 5,803,004 A | 9/1998 | Swann et al. |
| 5,834,082 A | 11/1998 | Day |
| 5,862,772 A | 1/1999 | Yancey et al. |
| 5,899,162 A | 5/1999 | Beaupreet et al. |
| 6,009,821 A | 1/2000 | Al-Rammah |
| 6,044,607 A | 4/2000 | Dumlao et al. |
| 6,050,208 A * | 4/2000 | Kennedy ................... 114/74 A |
| 6,070,378 A | 6/2000 | Dumlao et al. |
| 6,081,955 A | 7/2000 | Dumlao et al. |
| 6,092,350 A | 7/2000 | Dumlao et al. |
| 6,108,998 A | 8/2000 | Dumlao |
| 6,170,422 B1 | 1/2001 | Macander et al. |
| 6,182,409 B1 | 2/2001 | Visser |
| 6,630,249 B2 * | 10/2003 | Kennedy ..................... 428/625 |

FOREIGN PATENT DOCUMENTS

| | | |
|---|---|---|
| DE | 4303887 A1 | 4/1994 |
| EP | B 022 665 | 1/1981 |
| EP | A 058 970 | 9/1982 |

(List continued on next page.)

OTHER PUBLICATIONS

Oertel, Gunter, ed. Polyurethane Handbook, $2^{nd}$ ed., Hanser Publishers, New York: 1994, pp. 387–391, 218–220b 247–251.*

*Primary Examiner*—James J. Seidleck
*Assistant Examiner*—Melanie Bissett
(74) *Attorney, Agent, or Firm*—Fernando A. Borrego; Howard and Howard

(57) ABSTRACT

Composite elements have the following layer structure:
  (i) from 2 to 20 mm of metal,
  (ii) from 10 to 300 mm of polyisocyanate polyaddition products obtainable by reacting (a) isocyanates with (b) compounds which are reactive toward isocyanates in the presence of from 1 to 50% by volume, based on the volume of the polyisocyanate polyaddition products, of at least one gas (c) and also, if desired, (d) catalysts and/or (f) auxiliaries and/or additives,
  (iii) from 2 to 20 mm of metal.

9 Claims, No Drawings

FOREIGN PATENT DOCUMENTS

| | | |
|---|---|---|
| EP | A 108 710 | 5/1984 |
| EP | B 248 547 | 12/1987 |
| EP | B 297 801 | 1/1989 |
| EP | B 219 104 | 11/1992 |
| EP | A 512 183 | 11/1992 |
| EP | B 521 793 | 1/1993 |
| EP | B 559 568 | 9/1993 |
| EP | 602 760 A1 | 6/1994 |
| EP | 728783 A1 | 8/1996 |
| EP | A 693 598 | 11/1996 |
| EP | B 754 815 | 1/1997 |
| EP | 936 240 A2 | 8/1999 |
| EP | 960 723 A2 | 12/1999 |
| EP | A 1072505 | 1/2001 |
| WO | WO-A 90/01598 | 2/1990 |
| WO | WO-A 91/19866 | 12/1991 |
| WO | WO-A 92/12006 | 7/1992 |
| WO | WO-A 94/26585 | 11/1994 |
| WO | WO 98/21259 | 5/1998 |
| WO | WO-A 99/64233 | 12/1999 |
| WO | WO-A 99/64234 | 12/1999 |
| WO | WO-A 00/13890 | 3/2000 |
| WO | WO-A 00/30930 | 6/2000 |
| WO | WO-A 00/35746 | 6/2000 |
| WO | WO-A 00/59718 | 10/2000 |
| WO | WO-A 01/12499 | 2/2001 |

\* cited by examiner

COMPOSITE ELEMENTS CONTAINING POLYISOCYANATE-POLYADDITION PRODUCTS

The present invention relates to composite elements which have the following layer structure:
 (i) from 2 to 20 mm, preferably from 5 to 20 mm, particularly preferably from 5 to 10 mm, of metal,
 (ii) from 10 to 300 mm, preferably from 10 to 100 mm, of polyisocyanate polyaddition products obtainable by reacting (a) isocyanates with (b) compounds which are reactive toward isocyanates in the presence of from 0.1 to 50% by volume, preferably from 1 to 20% by volume, based on the volume of the polyisocyanate polyaddition products, of at least one gas (c) and also, if desired, (d) catalysts. and/or (e) auxiliaries and/or additives,
 (iii) from 2 to 20 mm, preferably from 5 to 20 mm, particularly preferably from 5 to 10 mm, of metal.

The invention further relates to a process for producing these composite elements and to their use.

The construction of ships, for example ship's hulls and hold covers, bridges or high-rise buildings require the use of structural components which can withstand considerable external forces. Owing to these requirements, such structural components usually comprise metal plates or metal supports which are strengthened by means of an appropriate geometry or suitable struts. Thus, hulls of tankers usually consist, because of increased safety standards, of an inner and an outer hull, with each hull being made up of 15 mm thick steel plates which are connected to one another by steel struts about 2 m long. Since these steel plates are subjected to considerable forces, both the inner and outer steel shells are reinforced by welded-on reinforcing elements. Disadvantages of these classical structural components are both the considerable amounts of steel which are required and the time-consuming and labor-intensive method of manufacture. In addition, such structural components have a considerable weight resulting in a lower tonnage of the ship and increased fuel consumption. Furthermore, such classical structural elements based on steel require a great deal of maintenance since both the outer surface and the surfaces of the steel parts between the outer and inner shells regularly have to be protected against corrosion.

It is an object of the present invention to develop structural components which withstand high external forces and can be used, for example, in shipbuilding, bridge construction or construction of high-rise buildings. The structural components to be developed, also referred to as composite elements, should be able to serve as replacements for known steel structures and, in particular, have advantages in respect of their weight, manufacturing process and maintenance intensity. In particular, the composite elements having large dimensions should be simple and quick to produce and also be able to be used in shipbuilding due to an improved resistance to hydrolysis.

We have found that this object is achieved by the composite elements described at the outset.

The composite elements of the present invention have, apart from excellent mechanical properties, the particular advantage that composite elements having very large dimensions are also obtainable. Such composite elements, which are obtainable by preparing a synthetic polymer (ii) between two metal plates (i) and (iii), have hitherto been obtainable only to a restricted extent because of the shrinkage of the synthetic polymer (ii) during and after its reaction. Owing to the shrinkage of the synthetic polymer (ii), for example the polyisocyanate polyaddition products, partial detachment of the synthetic polymer (ii) from the metal plates (i) and/or (iii) occurs. However, a very complete and very good adhesion of the synthetic polymer (ii) to the metal plates (i) and/or (iii) is of particular importance to the mechanical properties of such a composite element. The reaction of (a) with (b) in the presence of (c) largely avoids the shrinkage of (ii) and thus partial detachment from (i) and/or (iii).

As component (c) for preparing (ii), it is possible to use generally known compounds which are preferably gaseous at 25° C. and a pressure of 1 bar, for example air, carbon dioxide, nitrogen, helium and/or neon. Preference is given to using air. The component (c) is preferably inert toward the component (a), particularly preferably toward the components (a) and (b), i.e. reaction of the gas with (a) and (b) is barely detectable, preferably undetectable. The use of the gas (c) is fundamentally different from the use of customary blowing agents for producing foamed polyurethanes. While customary blowing agents are used in liquid form and during the reaction either vaporized as a result of the heat of reaction or else, in the case of water, form gaseous carbon dioxide owing to the reaction with the isocyanate groups, in the present invention preference is given to using the component (c) in gaseous form.

For preparing (ii), preference is given to using, as (e), customary foam stabilizers which are commercially available and are generally known to those skilled in the art, for example generally known polysiloxane-polyoxyalkylene block copolymers, e.g. Tegostab 2219 from Goldschmidt. The proportion of these foam stabilizers in the preparation of (ii) is preferably from 0.001 to 10% by weight, particularly preferably from 0.01 to 10% by weight, in particular from 0.01 to 2% by weight, based on the weight of the components (b), (e) and, if used, (d) employed for the preparation of (ii). The use of these foam stabilizers stabilizes the component (c) in the reaction mixture for preparing (ii).

The composite elements of the present invention can be produced by preparing, between (i) and (iii), polyisocyanate polyaddition products (ii), usually polyurethanes which can, if desired, contain urea and/or isocyanurate structures, which adhere to (i) and (iii) by reacting (a) isocyanates with (b) compounds which are reactive toward isocyanates in the presence of from 1 to 50% by volume, based on the volume of the polyisocyanate polyaddition products, of at least one gas (c) and also, if desired, (d) catalysts and/or (e) auxiliaries and/or additives.

The polyisocyanate polyaddition products can be described as compact products despite the use of (c), since a network of gas-filled cells is not formed.

The reaction is preferably carried out in a closed mold, i.e. (i) and (iii) are present, during filling with the starting components for preparing (ii), in a mold which is closed after complete introduction of the starting components. After the reaction of the starting components for preparing (ii), the composite element can be removed from the mold.

The surfaces of (i) and/or (iii) to which (ii) adheres after production of the composite elements are preferably sandblasted. This sandblasting can be carried out by conventional methods. For example, the surfaces can be blasted with customary sand under high pressure and thus, for example, cleaned and roughened. Suitable equipment for such treatment is commercially available.

This treatment of the surfaces of (i) and (iii) which are in contact with (ii) after the reaction of (a) with (b) in the presence of (c) and also, if desired, (d) and/or (e) leads to considerably improved adhesion of (ii) to (i) and (iii). Sandblasting is preferably carried out immediately before introduction of the components for preparing (ii) into the space between (i) and (iii).

The sandblasted metal plates may, if desired, be pretreated with primers customary in the shipbuilding industry. Such products are usually based on alkyl silicates or are primers having a high zinc content and based on epoxides or polyurethanes, and may be tar-modified.

After the preferred treatment of the surfaces of (i) and (iii), these layers are preferably fixed in a suitable arrangement, for example parallel to one another. The spacing is usually selected such that the space between (i) and (iii) has a thickness of from 10 to 300 mm, preferably from 10 to 100 mm. (i) and (iii) can, for example, be fixed in place by means of spacers. The edges of the intermediate space are preferably sealed such that the space between (i) and (iii) can be filled with (a) and (b) and (c) and also, if desired, (d) and/or (e) but these components are prevented from flowing out. Sealing can be carried out using customary plastic films or metal foils and/or metal plates which can also serve as spacers.

The layers (i) and (iii) are preferably customary metal plates, for example steel plates, having the thicknesses according to the present invention.

The space between (i) and (iii) can be filled either with (i) and (iii) aligned vertically or with (i) and (iii) aligned horizontally.

The filling of the space between (i) and (iii) with (a), (b) and (c) and also, if desired, (d) and/or (e) can be carried out using customary feeding equipment, preferably continuously, for example by means of high- and low-pressure machines, preferably high-pressure machines.

The feed rate can be varied depending on the volume to be filled. To ensure homogeneous curing of (ii), the feed rate and the feeding equipment are selected such that the space to be filled can be filled with the components for preparing (ii) within 0.5–20 minutes.

As layers (i) and (iii), usually plates, use can be made of customary metals, for example iron, conventional steel, all types of alloy steel, aluminum and/or copper.

Both (i) and (iii) can be used in coated form, for example primed, painted and/or coated with customary plastics, for producing the composite elements of the present invention, for example coated with the abovementioned primers. Preferably, (i) and (iii) are used in uncoated form and are particularly preferably cleaned, for example by customary sandblasting, before use.

The preparation of the polyisocyanate polyaddition products (ii), usually polyurethane and if desired polyisocyanurate products, in particular polyurethane elastomers, by reacting (a) isocyanates with (b) compounds which are reactive toward isocyanates in the presence of (c) and also, if desired, (d) catalysts and/or (e) auxiliaries and/or additives has been described extensively. The addition of blowing agents to the starting components for preparing (ii) is preferably avoided. To very largely avoid an uncontrolled foaming process, both the starting components (b) and (c) and also, if used, (d) and/or (e) as well as the surfaces of (i) and (iii) which come into contact with the reaction components should preferably be dry.

The water content of the reaction mixture comprising (a), (b), (c) and, if used, (d) and/or (e) is preferably from 0 to 0.3% by weight, particularly preferably from 0 to 0.03% by weight, in particular 0% by weight, based on the weight of the reaction mixture. The water content of, in particular, the component (b) can be set to the appropriate level by, for example, distillation. It is also possible to add compounds which bind water and thus prevent a blowing reaction to the reaction mixture. Such compounds, for example molecular sieves, are generally known. For example, it is possible to use silicates and oxazolidines in a suitable, preferably finely divided form. These compounds are preferably added to the reaction mixture, preferably the component (b), in amounts of from 0 to 5% by weight, particularly preferably from 1 to 3% by weight, based on the weight of the reaction mixture.

The starting materials (a), (b), (d) and (e) in the process of the present invention are described below by way of example:

Suitable isocyanates (a) are the aliphatic, cycloaliphatic, araliphatic and/or aromatic isocyanates, preferably diisocyanates, which are known per se and may have been modified by introduction of biuret and/or isocyanurate groups by generally known methods. Specific examples are: alkylene diisocyanates having from 4 to 12 carbon atoms in the alkylene radicals, e.g. dodecane 1,12-diisocyanate, 2-ethyltetramethylene 1,4-diisocyanate, 2-methylpentamethylene 1,5-diisocyanate, tetramethylene 1,4-diisocyanate, lysine ester diisocyanates (LDI), hexamethylene 1,6-diisocyanate (HDI), cyclohexane 1,3- and/or 1,4-diisocyanate, hexahydrotolylene 2,4- and 2,6-diisocyanate and also the corresponding isomer mixtures, dicyclohexylmethane 4,4'-, 2,2'- and 2,4'-diisocyanate and also the corresponding isomer mixtures, 1-isocyanato-3,3,5-trimethyl-5-isocyanatomethylcyclohexane (IPDI), tolylene 2,4- and/or 2,6-diisocyanate (TDI), diphenylmethane 4,4'-, 2,4'- and/or 2,2'-diisocyanate (MDI), polyphenylpolymethylene polyisocyanates and/or mixtures comprising at least two of the abovementioned isocyanates. Furthermore, diisocyanates and/or polyisocyanates containing ester, urea, allophanate, carbodiimide, uretdione and/or urethane groups can be used in the process of the present invention. Preference is given to using 2,4'-, 2,2'- and/or 4,4'- MDI and/or polyphenylpolymethylene polyisocyanates, particularly preferably mixtures comprising polyphenylpolymethylene polyisocyanates and at least one of the MDI isomers.

As compounds (b) which are reactive toward isocyanates, use can be made, for example, of compounds which have hydroxyl, thiol and/or primary and/or secondary amino groups as groups which are reactive toward isocyanates, e.g. polyols selected from the group consisting of polyether polyalcohols, polyester polyalcohols, polythioether polyols, hydroxyl-containing polyacetals and hydroxyl-containing aliphatic polycarbonates or mixtures of at least two of the polyols mentioned. These compounds usually have a functionality of from 2 to 6 and a molecular weight of from 400 to 8000 and are generally known to those skilled in the art.

Examples of suitable polyether polyalcohols are those which are obtainable by known methods by addition of alkylene oxides, for example tetrahydrofuran, 1,3-propylene oxide, 1,2- or 2,3-butylene oxide, styrene oxide and preferably ethylene oxide and/or 1,2-propylene oxide onto customary initiator substances. Initiator substances which can be used are, for example, known aliphatic, araliphatic, cycloaliphatic and/or aromatic compounds which contain at least one, preferably from 2 to 4, hydroxyl groups and/or at least one, preferably from 2 to 4, amino groups. Examples of initiator substances which can be used are ethane diol, diethylene glycol, 1,2- or 1,3-propanediol, 1,4-butanediol, 1,5-pentanediol, 1,6-hexanediol, 1,7-heptanediol, glycerol, trimethylolpropane, neopentyl glycol, sugar, for example sucrose, pentaerythritol, sorbitol, ethylenediamine, propanediamine, neopentanediamine, hexamethylene diamine, isophoronediamine, 4,4'-diaminodicyclohexylmethane, 2-(ethylamino)ethylamine, 3-(methylamino)

propylamine, diethylenetriamine, dipropylenetriamine and/ or N,N'-bis(3-aminopropyl ethylenediamine.

The alkylene oxides can be used individually, alternately in succession or as mixtures. Preference is given to using alkylene oxides which lead to primary hydroxyl groups in the polyol. The polyols used are particularly preferably ones which have been alkoxylated with ethylene oxide at the end of the alkoxylation and thus have primary hydroxyl groups.

Suitable polyester polyols can be prepared, for example, from organic dicarboxylic acids having from 2 to 12 carbon toms, preferably aliphatic dicarboxylic acids having from 4 to 6 carbon atoms, and polyhydric alcohols, preferably diols, having from 2 to 12 carbon atoms, preferably from 2 to 6 carbon atoms. The polyester polyols preferably have a functionality of from 2 to 4, in particular from 2 to 3, and a molecular weight of from 480 to 3000, preferably from 600 to 2000 and in particular from 600 to 1500.

The composite elements of the present invention are preferably produced using polyether polyalcohols as component (b) for reaction with the isocyanates, advantageously ones having a mean functionality of from 2 to 8, preferably from 1.5 to 6, and a molecular weight of from 400 to 8000.

The use of polyether polyalcohols offers considerable advantages as a result of improved resistance of the polyisocyanate polyaddition products to hydrolytic cleavage and due to the lower viscosity, in each case compared to polyester polyalcohols. The improved resistance to hydrolysis is of particular advantage when the products are used in shipbuilding. The lower viscosity of the polyether polyalcohols and the reaction mixture for preparing (ii) comprising the polyether polyalcohols makes it possible to fill the space between (i) and (iii) with the reaction mixture for producing the composite elements more quickly and simply. Owing to the considerable dimensions of, in particular, structural components in shipbuilding, low-viscosity liquids are of considerably advantage.

Further suitable isocyanate-reactive compounds are substances which have a hydrocarbon skeleton having from 10 to 40 carbon atoms and from 2 to 4 groups which are reactive toward isocyanates. For the purposes of the present invention, hydrocarbon skeleton means an uninterrupted sequence of carbon atoms which is not interrupted by, for example, oxygen atoms as in the case of ethers. As such substances, hereinafter also referred to as (b3), it is possible to use, for example, castor oil and its derivatives.

The isocyanate-reactive compounds used in the process of the present invention may also include, in addition to the abovementioned compounds having a usual molecular weight of from 400 to 8000, diols and/or triols having molecular weights of from 60 to<400 as chain extenders and/or crosslinkers. The addition of chain extenders, crosslinkers or, if desired, mixtures thereof can prove to be advantageous for modifying the mechanical properties, e.g. the hardness. The chain extenders and/or crosslinkers preferably have a molecular weight of from 60 to 300. Suitable chain extenders/crosslinkers are, for example, aliphatic, cycloaliphatic and/or araliphatic diols having from 2 to 14, preferably from 4 to 10, carbon atoms, e.g. ethylene glycol, 1,3-propanediol, 1,10-decanediol, o-, m-, p-dihydroxycyclohexane, diethylene glycol, dipropylene glycol and preferably 1,4-butanediol, 1,6-hexanediol and bis(2-hydroxyethyl)hydroquinone, triols, such as 1,2,4-, 1,3, 5-trihydroxycyclohexane, glycerol and trimethylolpropane, low molecular weight hydroxyl-containing polyalkylene oxides based on ethylene oxide and/or 1,2-propylene oxide and the abovementioned diols and/or triols as initiator molecules and/or diamines such as diethyltoluenediamine and/or 3,5-dimethylthio-2,4-toluenediamine.

If chain extenders, crosslinkers or mixtures thereof are employed for preparing the polyisocyanate polyaddition products, they are advantageously used in an amount of from 0 to 30% by weight, preferably from 1 to 30% by weight, based on the weight of all the isocyanate-reactive compounds (b) used.

In addition, it is possible to use aliphatic, araliphatic, cycloaliphatic and/or aromatic carboxylic acids as (b) to optimize the curing behavior in the preparation of (ii). Examples of such carboxylic acids are formic acid, acetic acid, succinic acid, oxalic acid, malonic acid, glutaric acid, adipic acid, citric acid, benzoic acid, salicylic acid, phenylacetic acid, phthalic acid, toluenesulfonic acid, derivatives of the acids mentioned, isomers of the acids mentioned and any mixtures of the acids mentioned. The proportion by weight of these acids can be from 0 to 5% by weight, preferably from 0.2 to 2% by weight, based on the total weight of (b).

The component (b) used is preferably a mixture comprising:

(b1) from 40 to 99% by weight of a polyether polyalcohol having a mean functionality of from 1.5 to 2.99 and a mean molecular weight of from 400 to 8000 and (b2) from 1 to 60% by weight of a polyether polyalcohol having a mean functionality of from 3 to 5 and a mean molecular weight of from 150 to 8000, where the weights indicated are in each case based on the total weight of the mixture.

The component (b) used is particularly preferably a mixture comprising:

(b1) from 40 to 98% by weight, preferably from 50 to 80% by weight, of a polyether polyalcohol having a mean functionality of from 1.9 to 3.2, preferably from 2.5 to 3, and a mean molecular weight of from 2,500 to 8000, (b2) from 1 to 30% by weight, preferably from 10 to 25% by weight, of a polyether polyalcohol having a mean functionality of from 1.9 to 3.2, preferably from 2.5 to 3, and a mean molecular weight of from 150 to 399 and (b3) from 1 to 30% by weight, preferably from 10 to 25% by weight, of at least one aliphatic, cycloaliphatic and/or araliphatic diol having from 2 to 14, preferably from 4 to 10, carbon atoms, where the weights indicated are in each case based on the total weight of the mixture.

The weight ratio of polyether polyalcohols to polyester polyalcohols in the component (b) is preferably>100, particularly preferably>1000; in particular, no polyester polyalcohols are used as (b) for preparing (ii).

In addition, the curing behaviour of the reaction mixture for preparing (ii) can be improved by the use of amineinitiated polyether polyalcohols. Preferably, the compounds (b) and also the other components for preparing (ii) have a very low water content in order to avoid the formation of carbon dioxide by reaction of the water with isocyanate groups.

As catalyst (d), it is possible to use generally known compounds which strongly accelerate the reaction of isocyanates with the compounds which are reactive toward isocyanates; preference is given to using a total catalyst content of from 0.001 to 15% by weight, in particular from 0.05 to 6% by weight, based on the weight of all the isocyanate-reactive compounds used. For example, the following compounds can be employed: triethylamine, tributylamine, dimethylbenzylamine, dicyclohexylmethylamine, dimethylcyclohexylamine, bis(N,N,-dimethylaminoethyl)

ether, bis(dimethylaminopropyl)urea, N-methyl morpholine or N-ethylmorpholine, N-cyclohexylmorpholine, N,N,N',N'-tetramethylethylenediamine, N,N,N',N'-tetramethylbutanediamine, N,N,N',N'-tetramethylhexane-1,6-diamine, pentamethyldiethylenetriamine, dimethylpiperazine, N-dimethylaminoethylpiperidine, 1,2-dimethylimidazole, 1-azabicyclo[2.2.0]octane, 1,4-diazabicyclo[2.2.2]octane (Dabco) and alkanolamine compounds such as triethanolamine, triisopropanolamine, N-methyldiethanolamine and N-ethyldiethanolamine, dimethylaminoethanol, 2-(N,N-dimethylaminoethoxy)ethanol, N,N',N'-tris(dialkylaminoalkyl)hexahydrotriazines, e.g. N,N',N''-tris(dimethylaminopropyl)-s-hexahydrotriazine, iron(II) chloride, zinc chloride, lead octoate and preferably tin salts, such as tin dioctoate, tin diethylhexanoate, dibutyltin dilaurate and/or dibutyldilaurytin mercaptide, 2,3-dimethyl-3,4,5,6-tetrahydropyrimidine, tetraalkylammoniumhydroxide, such as tetramethylammonium hydroxide, alkali metal hydroxides, such as sodium hydroxide, alkali metal alkoxides such as sodium methoxide and potassium isopropoxide, and/or alkali metal salts of long-chain fatty acids having from 10 to 20 carbon atoms and possibly lateral OH groups.

It has been found to be very advantageous to carry out the preparation of (ii) in the presence of (d) in order to accelerate the reaction.

If desired, (e) auxiliaries and/or additives can be incorporated into the reaction mixture for preparing the polyisocyanate polyaddition products (ii). Examples which may be mentioned are fillers, surface-active substances, dyes, pigments, flame retardants, hydrolysis inhibitors, fungistatic and bacteriostatic substances and the abovementioned molecular sieves and foam stabilizers.

Possible surface-active substances are, for example, compounds which serve to aid the homogenization of the starting materials and may also be suitable for regulating the structure of the polymers. Examples which may be mentioned are emulsifiers such as the sodium salts of castor oil sulfates or of fatty acids and also amine salts of fatty acids, e.g. diethylamine oleate, diethanolamine stearate, diethanolamine ricinoleate, salts of sulfonic acids, e.g. alkali metal or ammonium salts of dodecylbenzene- or dinaphthyl-methanedisulfonic acid and ricinoleic acid. The surface-active substances are usually employed in amounts of from 0.01 to 5% by weight, based on 100% by weight of all the isocyanate-reactive compounds (b) used.

Suitable flame retardants are, for example, tricresyl phosphate, tris(2-chloroethyl) phosphate, tris(2-chloropropyl) phosphate, tris(1,3-dichloropropyl) phosphate, tris(2,3-dibromopropyl) phosphate, tetrakis(2-chloroethyl) ethylenediphosphate, dimethyl methanephosphonate, diethyl diethanolaminomethylphosphonate and also commercial halogen-containing flame-retardant polyols. Apart from the abovementioned halogen-substituted phosphates, it is also possible to use inorganic or organic flame retardants such as red phosphorus, hydrated aluminum oxide, antimony trioxide, arsenic oxide, ammonium polyphosphate and calcium sulfate, expendable graphite or cyanuric acid derivatives such as melamine, or mixtures of at least two flame retardants such as ammonium polyphosphates and melamine and also, if desired, maize starch or ammonium polyphosphate, melamine and expendable graphite and/or aromatic or aliphatic polyesters for making the polyisocyanate polyaddition products flame resistant. In general, it has been found to be advantageous to use from 5 to 50% by weight, preferably from 5 to 25% by weight, of the flame retardants mentioned, based on the weight of all the isocyanate-reactive compounds used.

For the purposes of the present invention, fillers, in particular reinforcing fillers, are the customary organic and inorganic fillers, reinforcing materials, weighting agents, agents for improving the abrasion behavior in paints, coatings, etc., known per se. Specific examples are: inorganic fillers such as silicious minerals, for example sheet silicates such as antigorite, serpentine, hornblends, amphiboles, chrysotile and talc, metal oxides such as kaolin, aluminum oxides, titanium oxides and iron oxides, metal salts such as chalk, barite and inorganic pigments such as cadmium sulfide and zinc sulfide, and also glass, etc. Preference is given to using kaolin (china clay) aluminum silicate and coprecipitates of barium sulfate and aluminum silicate and also natural and synthetic fibrous minerals such as wollastonite, and short metal or glass fibers. Suitable organic fillers are, for example: carbon, melamine, rosin, cyclopentadienyl resins and graft polymers and also cellulose fibers, polyamide, polyacrylonitrile, polyurethane or polyester fibers based on aromatic and/or aliphatic dicarboxylic esters and, in particular carbon fibers. The inorganic and organic fillers can be used individually or as mixtures.

In the preparation of (ii), preference is given to using from 10 to 70% by weight of fillers, based on the weight of (ii), as (e) auxiliaries and/or additives. Preferred fillers are talc, kaolin, calcium carbonate, barite, glass fibers and/or glass microspheres. The size of the filler particles is preferably selected such that the introduction of the components for preparing (ii) into the space between (i) and (iii) is not hindered. The fillers particularly preferably have particle sizes of <0.5 mm.

The fillers are preferably used in admixture with the polyol component in the reaction for preparing the polyisocyanate polyaddition products.

The fillers can serve to reduce the coefficient of thermal expansion of the polyisocyanate polyaddition products which is greater than, for example, that of steel and thus to match it to that of steel. This is particularly advantageous for obtaining a permanently strong bond between the layers (i), (ii) and (iii), since it reduces the stresses between the layers when temperature changes occur.

The weight of (ii) corresponds by definition to the weight of the components (a), (b) and (c) and also, if used, (d) and/or (e) employed for the preparation of (ii).

For the reaction with (a), i.e. for preparing (ii), particular preference is given to using a mixture comprising:
(b1) from 40 to 98% by weight, preferably from 50 to 80% by weight, of a polyether polyalcohol having a mean functionality of from 1.9 to 3.2, preferably from 2.5 to 3, and a mean molecular weight of from 2500 to 8000,
(b2) from 1 to 30% by weight, preferably from 10 to 25% by weight, of a polyether polyalcohol having a mean functionality of from 1.9 to 3.2, preferably from 2.5 to 3, and a mean molecular weight of from 150 to 399 and
(b3) from 1 to 30% by weight, preferably from 10 to 25% by weight, of at least one aliphatic, cycloaliphatic and/or araliphatic diol having from 2 to 14, preferably from 4 to 10, carbon atoms, where the weights indicated for (b1), (b2) and (b3) are in each case based on the weight of the sum of the components (b1), (b2) and (b3),
(e1) from 0.001 to 10% by weight, based on the total weight of the mixture, of foam stabilizers, and
(e2) from 0 to 5% by weight, based on the total weight of the mixture, of molecular sieves.

To prepare the polyisocyanate polyaddition products used according to the present invention, the isocyanates and the compounds which are reactive toward isocyanates are reacted in such amounts that the equivalence ratio of NCO groups of the isocyanates to the sum of the reactive hydrogen atoms of the compounds which are reactive toward isocyanates is 0.85–1.25:1 preferably 0.95–1.15:1 and in particular 1–1.05:1. If (ii) contains at least some bound isocyanurate groups, it is usual to employ a ratio of NCO groups to the sum of reactive hydrogen atoms of 1.5–60:1, preferably 1.5–8:1.

The polyisocyanate polyaddition products are usually prepared by the one-shot method or by the prepolymer method, for example by means of the high-pressure or low-pressure technique.

It has been found to be particularly advantageous to employ the two-component process and to combine the isocyanate-reactive compound (b) and any catalysts (d) and/or auxiliaries and/or additives (e) as component (A) and preferably mix them intimately with one another, and to use the isocyanates (a) as component (B).

The component (c) can be added into the reaction mixture comprising (a), (b) and, if desired, (d) and (e), and/or be added to the individual components (a), (b), (A) and/or (B) described above. The component which is mixed with (c) is usually in liquid form. The component is preferably mixed into the component (b).

The mixing of the appropriate component with (c) can be carried out by generally known methods. For example, (c) can be introduced into the appropriate component by means of generally known charging equipment, for example air charging equipment, preferably under pressure, for example from a pressure vessel or compressed by means of a compressor, e.g. through a nozzle. The corresponding components are preferably thoroughly mixed with (c) so that gas bubbles of (c) in the usually liquid component preferably have a size of from 0.0001 to 10 mm, particularly preferably from 0.0001 to 1 mm.

The content of (c) in the reaction mixture for preparing (ii) can be determined via the density of the reaction mixture in the return line of the high-pressure machine using generally known measuring instruments. The content of (c) in the reaction mixture can be regulated on the basis of this density by means of a control unit, preferably automatically. The component density can be determined and regulated on-line during the customary circulation of the material in the machine, even at a very low circulation rate.

The sandwich element can be produced, for example, by sealing the space between (i) and (ii) which is to be filled with the starting components for preparing (ii) except for an inlet and outlet for the starting components and introducing the starting components (a), (b), (c) and, if used, (d) and/or (e), preferably in mixed form, via the inlet, preferably using a customary high-pressure machine, into the space between (i) and (iii).

The starting components are usually mixed at from 0 to 100° C., preferably from 20 to 60° C., and are, as described above, introduced into the space between (i) and (iii). Mixing can be carried out mechanically by means of a stirrer or a stirring screw, but preferably by means of the counter-current principle customary in high-pressure machines, in which high-pressure jets of the A and B components meet and mix in the mixing head. The jet of each component can also be divided. The reaction temperature, i.e. the temperature at which the reaction occurs, is usually >20° C., preferably from 50 to 150° C.

The polyisocyanate polyaddition products (ii) of the composite elements produced according to the present invention preferably have a modulus of elasticity of >275 MPa in the temperature range from −45 to +50° C. (in accordance with DIN 53457), an adhesion to (i) and (iii) of >4 MPa (in accordance with DIN 53530), an elongation of >30% in the temperature range from −45 to +50° C. (in accordance with DIN 53504), a tensile strength of >20 MPa (in accordance with DIN 53504) and a compressive strength of >20 MPa (in accordance with DIN 53421).

The composite elements which can be produced by the process of the present invention have the following advantages compared to known constructions:

Owing to the use of (c), shrinkage of (ii) and thus impairment of the adhesion of (ii) to (i) and (iii) can be avoided.

Struts and similar stiffening elements become virtually completely superfluous. This leads to a considerable cost reduction in production due to savings in materials and to significantly simpler corrosion protection.

When used in shipbuilding, the reduced weight results in a higher tonnage or reduced fuel consumption.

Maintenance is significantly simplified, for example with regard to corrosion protection. As a result, maintenance does not have to be carried out as often.

The sandwich structure incorporating the polyisocyanate polyaddition product, for example the polyurethane elastomer, leads to better energy absorption and thus reduced crack propagation. Known steel structures have a strong tendency to crack formation on further stressing after perforation, i.e. the leak spreads over a large area of the ship's hull. This minimizes the damage risk in the case of accidents or when under extreme stress. This improved safety standard is particularly advantageous for tankers.

The preferred polyisocyanate polyaddition products based on polyether polyalcohols are more resistant to hydrolytic degradation than are products based on polyester polyalcohols.

This offers considerable advantages, particularly for use of the composite elements in shipbuilding.

The preferred reaction mixture comprising the polyether polyalcohols for preparing (ii) has a significantly lower viscosity than reaction mixtures based on polyester polyalcohols.

This makes possible simpler and faster manufacture of the composite elements.

The preferred content of fillers in the preferred polyisocyanate polyaddition products reduces the coefficient of thermal expansion of (ii) and thus enables it to be matched to the coefficients of (i) and (iii). Stresses between (i), (ii) and (iii) due to temperature changes, in particular due to the ambient temperature, for example different water temperatures in the case of ships' hulls, can be reduced according to the present invention. The adhesion of (ii) to (i) and (iii) is lastingly improved as a result.

The preferred sandblasting of the surfaces of (i) and (iii) enables the adhesion of (ii) to (i) and (iii) to be significantly improved. The improved adhesion gives a more stable and more durable structural element.

Accordingly, the composite elements obtainable according to the present invention are used primarily in areas which require structural elements that withstand large forces, for example as structural components in shipbuilding, e.g. in ships' hulls, for example ships' double hulls comprising an outer and an inner wall, and hold covers, or in civil engineering construction, for example bridges, or as structural elements in housing construction, particularly in high-rise buildings.

The composite elements of the present invention should not be confused with classic sandwich elements which comprise a rigid polyurethane and/or polyisocyanurate foam core and are customarily used for thermal insulation. Such known sandwich elements would be unsuitable for the applications mentioned because of their comparatively low mechanical strength.

We claim:

1. Composite element having the following layer structure:
   (i) from 2 to 20 mm of metal,
   (ii) from 10 to 300 mm of polyisocyanate polyaddition products comprising the reaction product of (a) isocyanates with (b) compounds which are reactive toward isocyanates in the presence of from 0.1 to 50% by volume, based on the volume of the polyisocyanate polyaddition products, of at least one added gas (c) and also, optionally, (d) catalysts and/or (e) auxiliaries and/or additives,
   (iii) from 2 to 20 mm of metal, and
   has a modulus of elasticity of >275 MPa in the temperature range of from −45 to +50° C., and adhesion to (i) and (iii) of >4 MPa, an elongation of >30% in the temperature range of from −45 to +50° C., a tensile strength of >20 MPa and a compressive strength of >20 MPa.

2. A composite element as claimed in claim 1 comprising air as gas (c).

3. A composite element as claimed in claim 1 comprising foam stabilizers as (e).

4. A composite element as claimed in claim 1, wherein at least one polyether polyol is used as (b).

5. A composite element as claimed in claim 1 comprising (ii) from 10 to 70% by weight of fillers, based on the weight of (ii), as (e) auxiliaries and/or additives.

6. A process for producing a composite element as claimed in any of claims 1 to 5, wherein polyisocyanate polyaddition products (ii) which adhere to (i) and (iii) are prepared between (i) and (iii) by reacting (a) isocyanates with (b) compounds which are reactive toward isocyanates in the presence of from 0.1 to 50% by volume, based on the volume of the polyisocyanate polyaddition products, of at least one added gas (c) and also, optionally, (d) catalysts and/or (e) auxiliaries and/or additives.

7. A process as claimed in claim 6, wherein the reaction is carried out in a closed mold.

8. A process as claimed in claim 6, wherein use is made of a mixture comprising:
   (b1) from 40 to 98% by weight of a polyether polyalcohol having a mean functionality of 1.9 to 3.2, and a mean molecular weight of from 2500 to 8000,
   (b2) from 1 to 30% by weight of a polyether polyalcohol having mean functionality of from 1.9 to 3.2, and a mean molecular weight of from 150 to 399 and
   (b3) from 1 to 30% by weight of at least one aliphatic, cycloaliphatic and/or araliphatic diol having from 2 to 14 carbon atoms,
   where the weights indicated for (b1), (b2) and (b3) are in each case based of the components (b1)), (b2) and (b3),
   (e1) from 0.001 to 10% by weight, based on the total weight of the mixture, of foam stabilizers, and
   (e2) from 0 to 5% by weight, based on the total weight of the mixture, of molecular sieves.

9. A composite element obtainable by a process as claimed in claim 6.

* * * * *